United States Patent
Klatt et al.

[11] Patent Number: 5,923,245
[45] Date of Patent: Jul. 13, 1999

[54] REAR AIR GUIDING DEVICE WITH BRAKE LIGHT FOR A MOTOR VEHICLE

[75] Inventors: Joachim Klatt, Wiernsheim; Manfred Appel, Muehlacker, both of Germany

[73] Assignee: Dr. Ing. h.c.F. Porsche AG, Weissach, Germany

[21] Appl. No.: 08/993,300

[22] Filed: Dec. 18, 1997

[30] Foreign Application Priority Data

Dec. 18, 1996 [DE] Germany .......................... 196 52 692

[51] Int. Cl.$^6$ .................................................. B60Q 1/44
[52] U.S. Cl. ..................... 340/479; 296/180.1; 180/68.3; 362/541; 362/548
[58] Field of Search .................................. 340/479, 480; 296/180.1, 180.3, 180.5; 180/68.1, 68.3; 362/523, 541, 545, 547, 548

[56] References Cited

U.S. PATENT DOCUMENTS

| | | | |
|---|---|---|---|
| 4,845,600 | 7/1989 | Matsumura et al. | 340/479 |
| 4,887,681 | 12/1989 | Durm et al. | 180/68.1 |
| 4,889,382 | 12/1989 | Burst et al. | 296/180.5 |
| 5,062,027 | 10/1991 | Machida et al. | 362/800 |
| 5,119,068 | 6/1992 | Nagai et al. | 340/479 |
| 5,700,080 | 12/1997 | Okuda | 340/479 |

FOREIGN PATENT DOCUMENTS

| | | |
|---|---|---|
| 37 35 185 | 5/1989 | Germany . |
| 44 26 155 | 1/1996 | Germany . |
| 61-160330 | 7/1986 | Japan . |
| 63-219439 | 9/1988 | Japan . |
| 2-120195 | 5/1990 | Japan . |

*Primary Examiner*—Donnie L. Crosland
*Attorney, Agent, or Firm*—Evenson, McKeown, Edwards & Lenahan, P.L.L.C.

[57] ABSTRACT

A motor vehicle, particularly a passenger car, having an extendable air guiding device and at least one elongated additional brake light in the rear area. An additional brake light arrangement is provided at reasonable cost, which can be used for a coupe version as well as for a convertible version of a motor vehicle provided with an extendable air guiding device. On a vehicle body part disposed in front of the air guiding device, a first additional brake light is arranged and, on a transversely extending, rearward edge area of the extendable air guiding device, a second additional brake light is arranged. According to the position of the rearward-side air guiding device, at least one of the brake lights is connected which is visible from the rear at the time.

18 Claims, 6 Drawing Sheets

REAR AIR GUIDING DEVICE WITH BRAKE LIGHT FOR A MOTOR VEHICLE

The invention relates to a motor vehicle, particularly a passenger car, having an air guiding device, which is arranged in the rear area and can be displaced from a retracted inoperative position into an extended operative position, and having at least one additional brake light.

BACKGROUND AND SUMMARY OF THE INVENTION

This application claims the priority of Federal Republic of Germany Patent Application No. 196 52 692.2 filed Dec. 18, 1996, the disclosure of which is expressly incorporated by reference herein.

In the case of a known coupe-type motor vehicle (Porsche 911 Carrera) having an extendable air guiding device arranged on the rear side, a transversely extending trim plate, which forms an extension of the roof contour disposed in front of it, is arranged on the upper edge of the rear window, in which trim plate an elongated additional brake light is arranged approximately in the center.

In the case of the convertible or Targa version of the same passenger car, instead of the transversely extending, rear-window-side trim plate, a fitted-on, upwardly projecting holding bow is provided above the extendable air guiding device on the rear lid, which holding bow receives the additional brake light.

Both constructions have the disadvantage that, for the coupe version, on the one hand, and for the convertible or Targa version, on the other hand, in each case differently constructed additional components must be provided for receiving the additional brake lights, which results in high costs.

It is an object of the invention to provide, on a rear area of a motor vehicle provided with an extendable air guiding device, an additional brake light arrangement which, while the costs are reduced, can be used for different vehicle body variants.

This and other objects have also been achieved by according to the present invention by providing a motor vehicle having an air guiding device, which is arranged in the rear area and can be displaced from a retracted inoperative position into an extended operative position, and having at least one additional brake light, wherein, on a vehicle body part which directly adjoins the front edge of the air guiding device, a first additional brake light is provided and, on a transversely extending rearward edge area of the air guiding device , a second additional brake light is provided, according to the position of the air guiding device, at least the brake light being connected which at the time is visible from the rear.

This and other objects have also been achieved by according to the present invention by providing an arrangement of a brake light in a motor vehicle having a rear air guiding device, comprising: a rear body structure of a motor vehicle defining an indentation for receiving an air guiding device; an air guiding device operatively coupled to said rear body structure to be movable between a retracted inoperative position located at least partially within said indentation and an extended operative position at least partially outside of said indentation, said air guiding device defining a rearward-facing recess, said recess being located within said indentation when in said retracted inoperative position and being located outside of said indentation when in said extended operative position; and a brake light disposed in said recess.

This and other objects have also been achieved by according to the present invention by providing a rear air guiding device for a motor vehicle, comprising: an upper shell including a plurality of fins; and a lower shell connected to said upper shell, said lower shell defining a rearward-facing recess for receiving a brake light.

The principal advantages achieved by means of the invention are that, as the result of the arrangement of two additional brake lights in the rear area which are arranged separately from one another, one being disposed in front of the air guiding device, and the other being arranged on the rearward edge area of the air guiding device, a brake light arrangement is provided which, while the costs are reduced, can be used for different vehicle body variants with an extendable air guiding device so that cost-intensive, additional trip plates or fitted-on holding bows are not required.

The first additional brake light is placed in a recess of a niche-type indentation of a stationary rear center part or of a folding top compartment lid and is held in position there. The second additional brake light is arranged on the transversely extending rear side of the extendable air guiding device, specifically in a niche-type receiving device of the air guiding device. In the retracted inoperative position of the air guiding device, the first brake light disposed in front is connected and visible whereas the second brake light is covered by the engine cover. When the air guiding device is extended, starting from an intermediate position, the second brake light is connected and visible since the first brake light is covered by the air guiding device.

Other objects, advantages and novel features of the present invention will become apparent from the following detailed description of the invention when considered in conjunction with the accompanying drawings.

DETAILED DESCRIPTION OF THE PREFERRED EMBODIMENTS OF THE INVENTION

Figure 1:
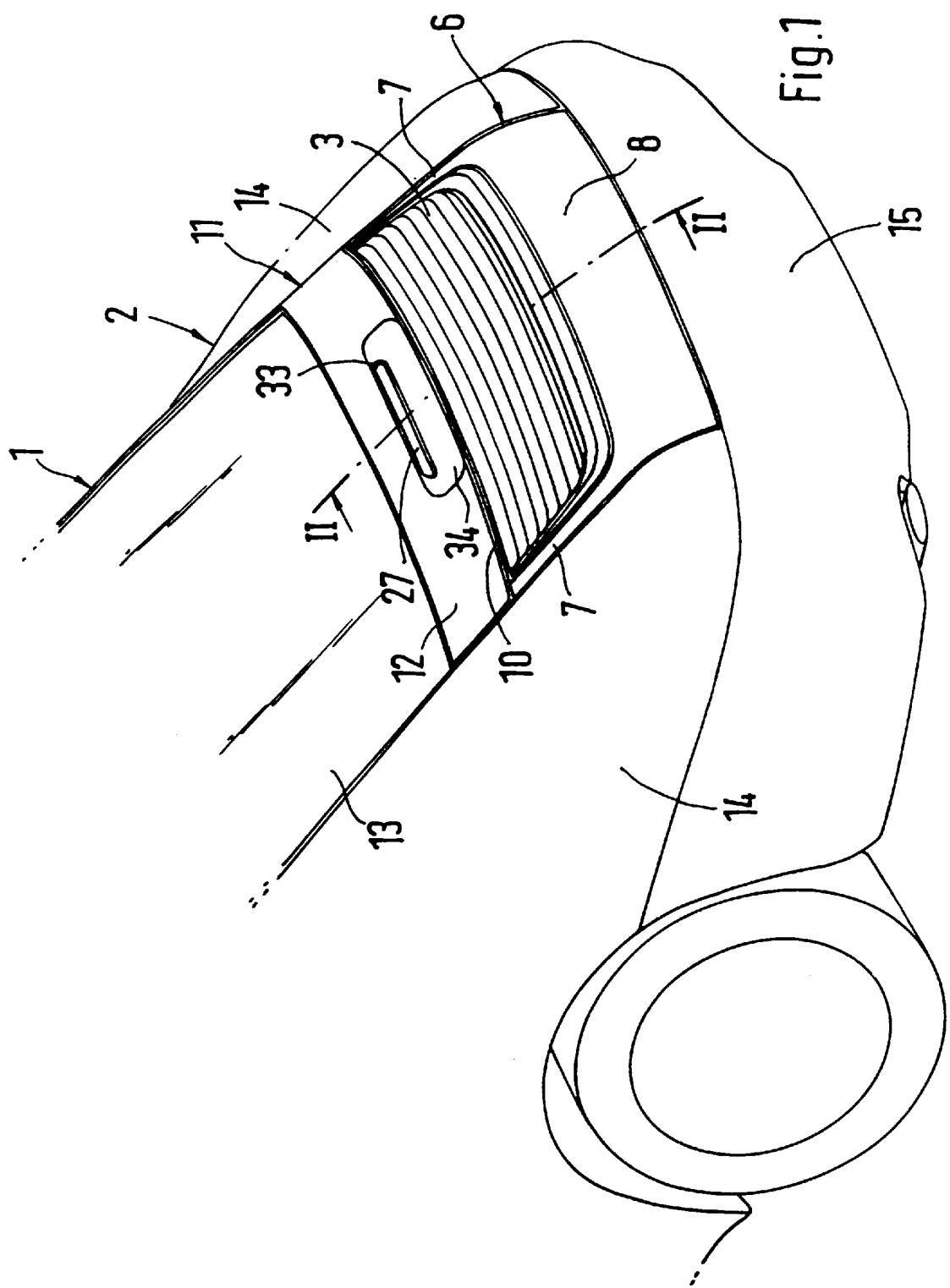
FIG. 1 is a perspective partial view diagonally from the rear of the rear area of a coupe version of a passenger car with an extendable air guiding device.
Figure 2:
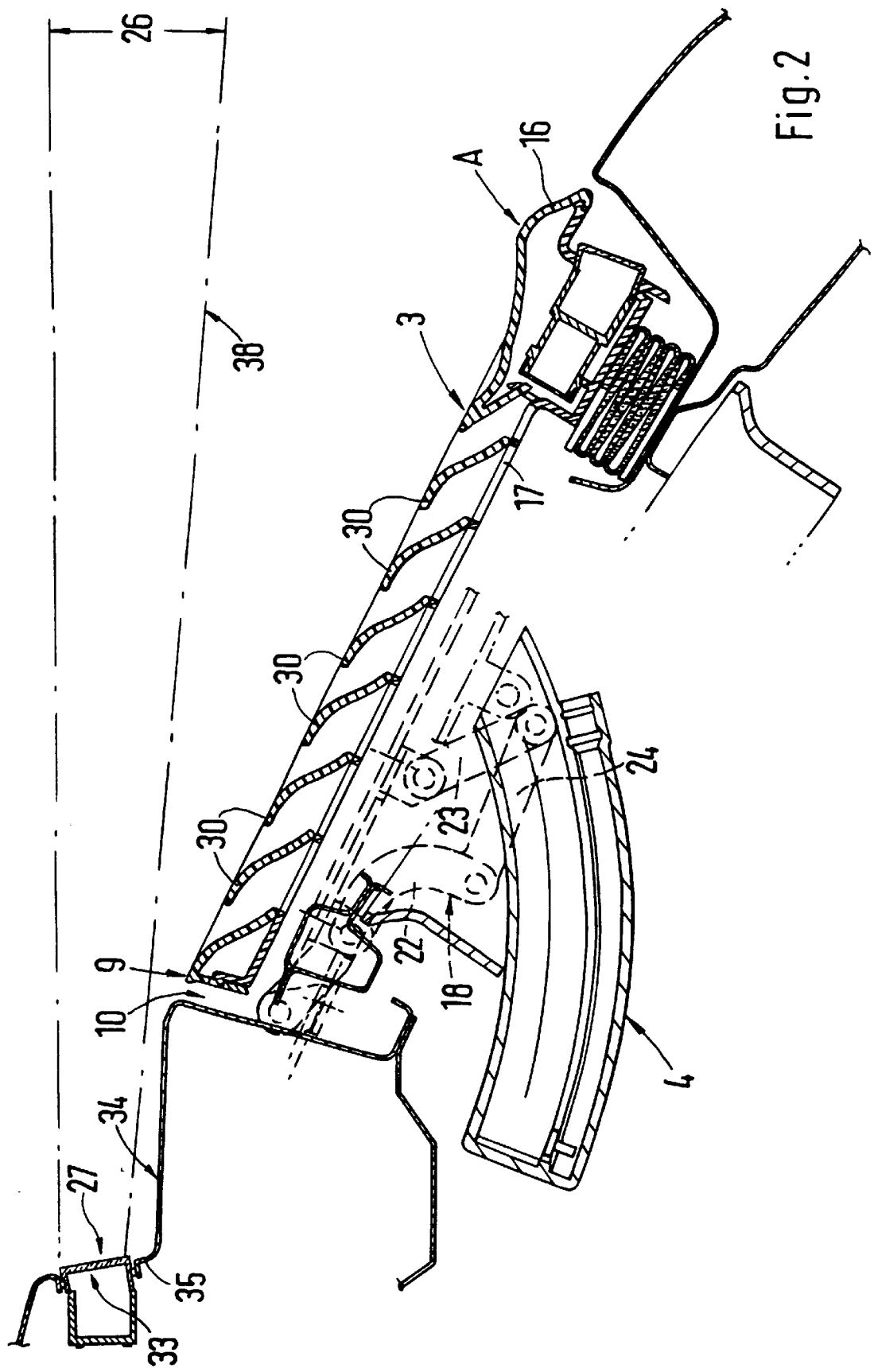
FIG. 2 is a sectional view according to Line II—II of FIG. 1, the extendable air guiding device in a retracted inoperative position.
Figure 3:
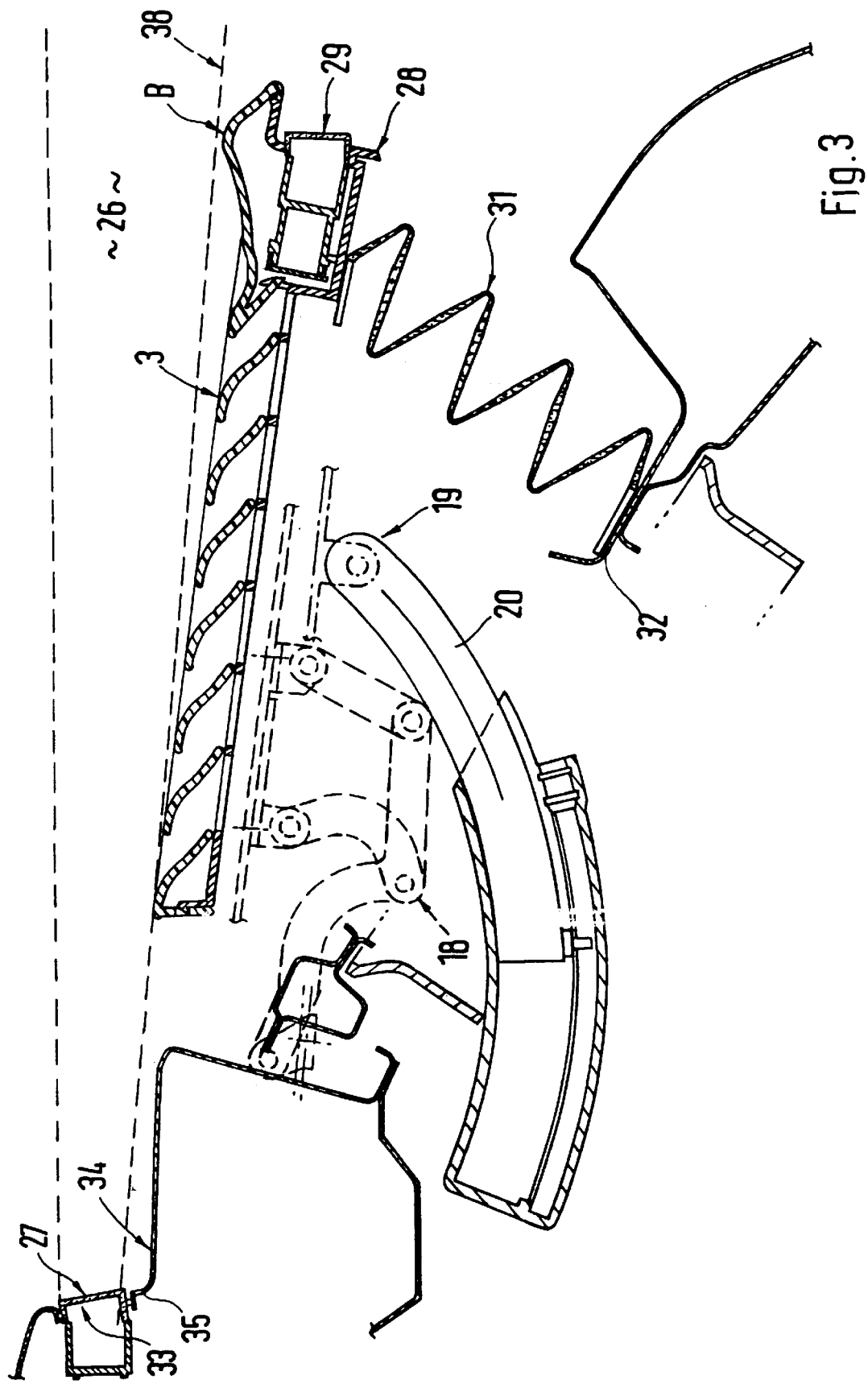
FIG. 3 is a sectional view corresponding to FIG. 2, the air guiding device in an extended intermediate position B, in which its upper edge touches the lower boundary line of the legally required brake light visibility range.
Figure 4:
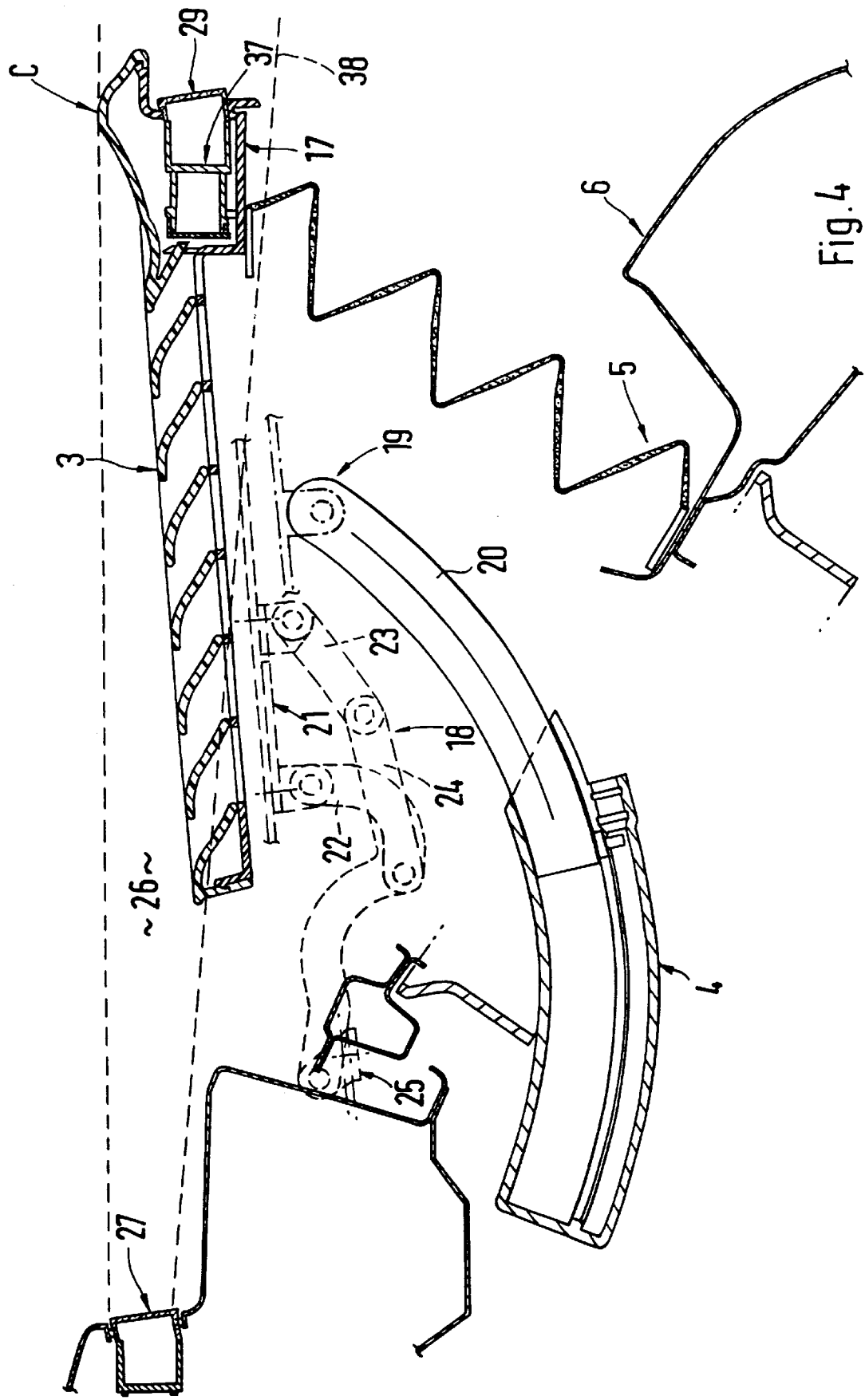
FIG. 4 is a sectional view corresponding to FIG. 2, the air guiding device in a completely extended operative position, and the second brake light on the air guiding device covering the first brake light disposed in front of it.

The coupe version of a passenger car 1 illustrated in FIG. 1 comprises in the rear area 2 an extendable air guiding device 3. As shown in FIGS. 2–4, the extendable air guiding device 3 can be displaced via a driving device 4 from a retracted inoperative position A, by way of intermediate positions B, into a completely extended operative position C and vice versa.

The air guiding device 3 is placed into a large-surface indentation 5 of a rear lid 6 and extends in the inoperative position A approximately flush with the body shell to lateral legs 7 and rearward contour 8 of the rear lid 6. The front edge 9 of the air guiding device 3 forms the forward edge of the rear lid 6 and extends, while forming a narrow gap 10, to the adjoining vehicle body part 11 which, according to FIG. 1, is formed by a stationary rear center part 12. A stationary rear window 13 extends in front of the rear center part 12.

The rearward side parts 14 extend on both sides of the rear window 13, of the rear center part 12 and of the rear lid 6. The lower edges of the rear lid 6 and of the lateral parts 14 adjoin an elastic rearward end part 15.

The air guiding device 3, which is composed of two plastic shells 16, 17, is connected on its upper edge by way of two spaced hinges 18 in an articulated manner with the rear lid 6 disposed below it.

In an area of the air guiding device 3 disposed farther in the rear, the movable end 19 of a tilting device 20 of the driving device 4 is applied to the interior plastic shell 17. During the extending movement of the air guiding device, the tilting device 20 moves along an arc-shaped path upward and rearwards. Each hinge 18 comprises a plate or console 21 which is fixed to the spoiler and on which two spaced control arms 22, 23 are rotatably disposed at one of their ends. The other ends of the two control arms 22, 23 are rotatably connected with an elongated arm 24 bent at right angles, in order to form a four-bar linkage including the console 21, the control arms 22, 23 and the elongated arm 24. The free end of the arm 24 is hinged to a bearing block 25 which is fixed to the lid.

This construction of the two hinges 18 prevents the front edge 9 of the air guiding device 4 from rising upwards too early and projecting into the radiation area 26 of the first additional brake light 27 disposed in front during the extending operation.

The exterior plastic shell 16 is constructed in the manner of an air inlet grid with transversely extending fins 30, in which case, by means of a fan, which is arranged on the interior side of the rear lid 6 and is not shown in detail, air is taken in from the exterior side of the vehicle through the air inlet grid and an opening provided on the rear lid 6. The rearward edge area 28 of the tilted-out air guiding device 4 is connected with a flange 32 of the rear lid 6 by way of an accordion-type covering element 31.

According to the invention, on the vehicle body part 11 directly adjoining the front edge 9 of the rearward-side air guiding device 4, the first elongated additional brake light 27 is provided and, in a transversely extending, rearward edge area 28 of the extendable air guiding device 4, a second additional brake light 29 is provided, in which case, depending on the position of the air guiding device 4, at least the brake light 27 or 29 is connected which at that time is visible from the rear.

According to FIGS. 1 to 4, the first additional brake light 27 is placed in a recess 33 of a niche-type indentation 34 of the stationary rear center part 12 and is held in position there by means of fastening elements which are not shown in detail.

In the embodiment, the recess 33 is arranged on an upright wall section 35 of the niche-shaped indentation 34.

Figure 5:
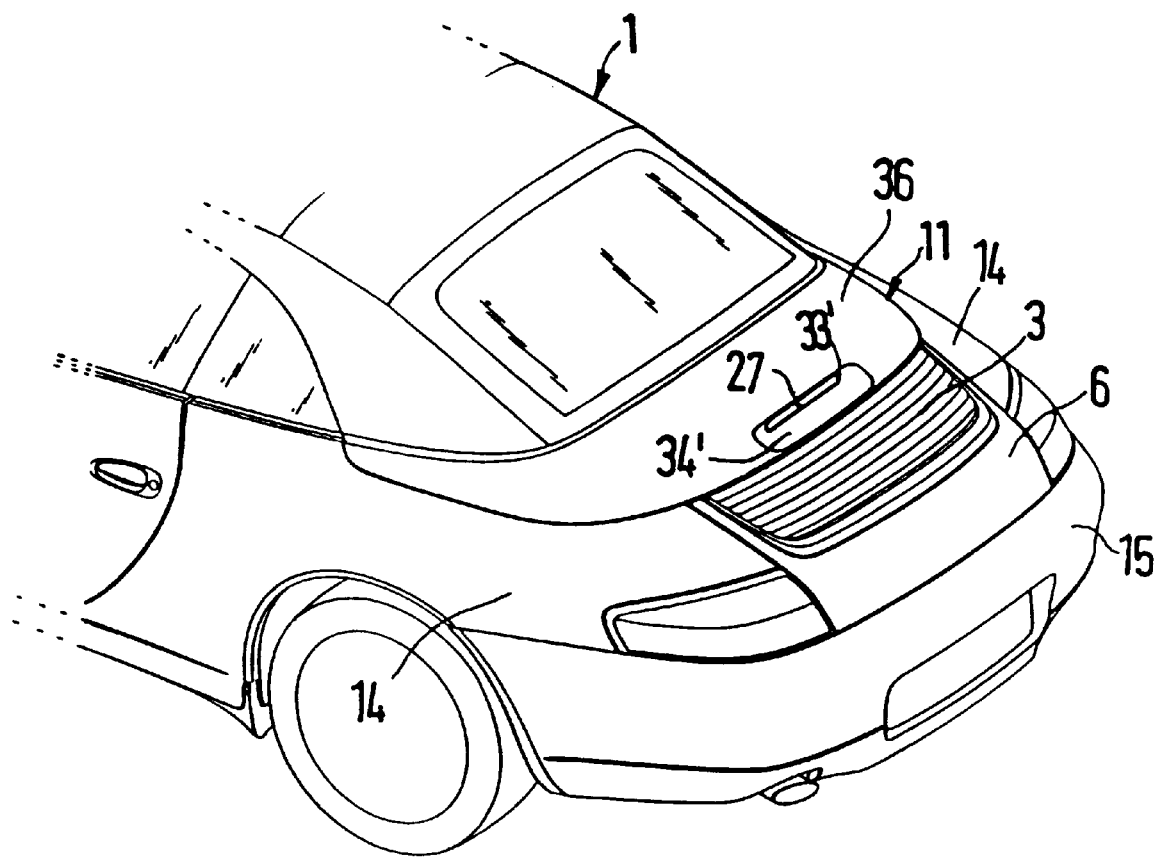
FIG. 5 is a perspective partial view diagonally from the rear onto the rear area of a convertible version of the passenger car with an extendable air guiding device.

In the case of the second vehicle body version of the passenger car 1 illustrated in FIG. 5, specifically the con- vertible version, the first additional brake light 27 is placed in a recess 33' of a niche-type indentation 34' of a folding top compartment lid 36 and is held in position there. The vehicle-side installation position and the construction of the niche-type indentation 34, 34', of the recess 33, 33' as well as of the first brake lights 27 are identical in the case of both embodiments (coupe version and convertible version).

The second additional brake light 29 is placed in a niche-shaped recess 37 arranged on the rearward side of the extendable air guiding device 3, the receiving device 37 being constructed on the interior plastic shell 17 of the air guiding device 3.

In the retracted inoperative position A of the air guiding device 3, the second additional brake light 29 is covered and is not visible from the exterior side of the vehicle (FIG. 2). In this position of the air guiding device 3, only the first additional brake light 27 is connected.

FIG. 3 illustrates an intermediate position B of the air guiding device 3, in which case the front edge 9 of the air guiding device 3 just barely touches the lower boundary line 38 of the legally required radiation range 26. Starting from this intermediate position B, at least one of the two brake lights 27, 29 must be connected or, starting from this intermediate position B, a change-over can take place between both brake lights 27, 29.

Figure 6:
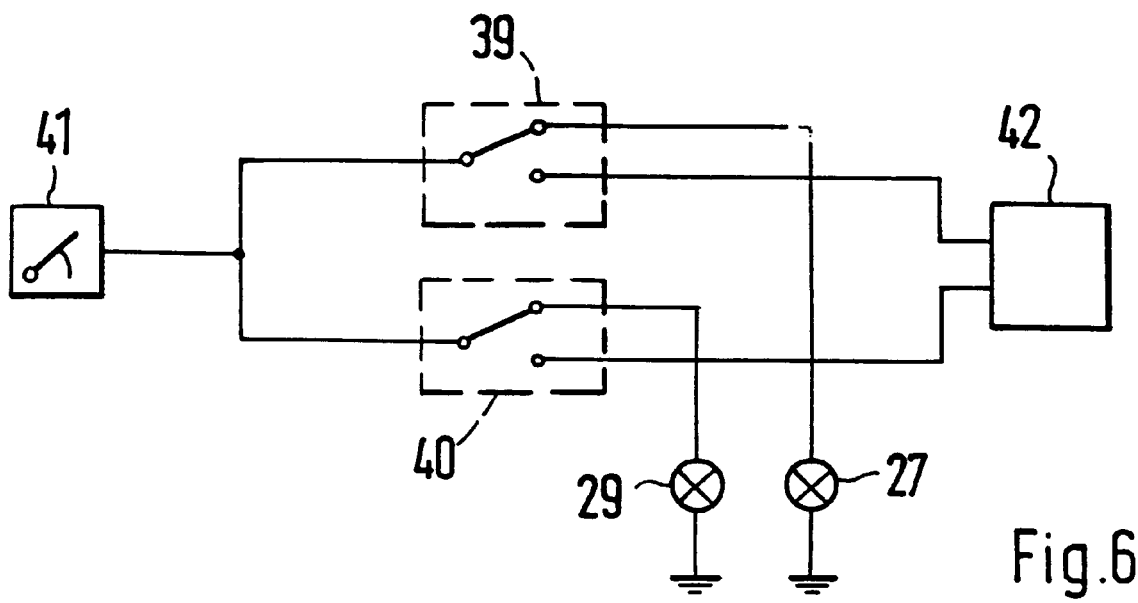
FIG. 6 is a wiring diagram of a first embodiment of the wiring for triggering the additional brake light.
Figure 7:
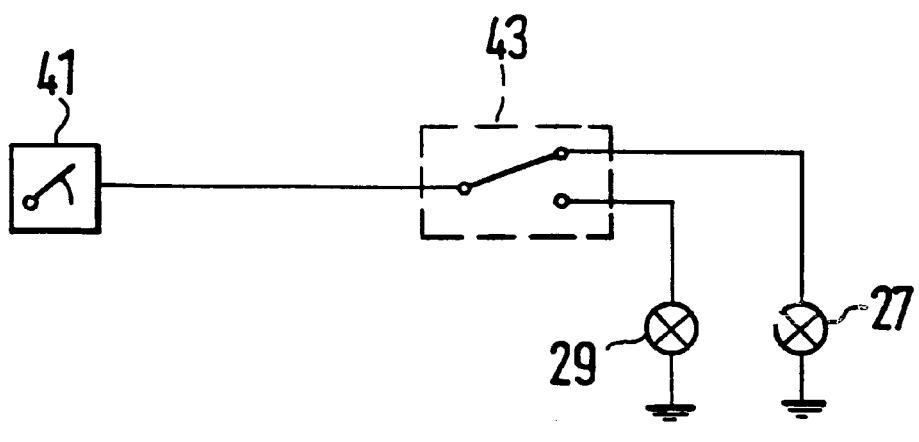
FIG. 7 is a wiring diagram of a second embodiment of the wiring for triggering the additional brake light.

FIGS. 6 and 7 illustrate two alternatively possible wirings for triggering the additional brake light. FIG. 6 shows a wiring, in the case of which, during the movement phase of the air guiding device 3, both brake lights 27, 29 are energized during a braking operation. In contrast, FIG. 7 shows a wiring, in the case of which during a braking operation and a moved air guiding device 3 only one of the two additional brake lights 27 or 29 is energized and a change-over between the two brake lights 27, 29 takes place during the movement of the air guiding device 3.

FIG. 6 shows a first, vehicle-body-fixed brake light 27 as well as a second brake light 29 arranged on the air guiding device 3. A first switch 39 monitors the operative position C of the air guiding device 3, while a second switch 40 monitors the inoperative position A of the air guiding device 3. The signal for energizing the brake lights 27, 29 is supplied by a brake light switch 41, which is known per se and with which the switches 39, 40 are connected on the input side. On the output side, the inoperative contacts are connected with the brake lights 27, 29, while the operative contacts lead to a control unit 42 for controlling the movement of the air guiding device 3. The first switch 39 is in its operative position when the air guiding device 3 has reached its operative position C. Otherwise, the first switch 39 is in its inoperative position. The second switch 40 changes into its operative position as soon as the air guiding device 3 has reached its inoperative position A and otherwise takes up its inoperative position.

The illustrated wiring operates in that, by means of the switches 39, 40, the respective assigned brake light 27, 29 will no longer be connected with the brake light switch 41 when the respective switch 39, 40 moves into its operative position. As a result, the first brake light 27 will then be switched off precisely when the air guiding device 3 reaches its operative position C, and the second brake light 29 will be switched off precisely when the air guiding device 3 reaches its inoperative position A. During the movement of the air guiding device 3, both brake lights 27, 29 will therefore light up simultaneously, if a signal of the brake light switch 41 is applied.

In contrast, in the wiring according to FIG. 7, only a single switch 43 is provided. This switch 43 is arranged on the air guiding device 3 or on a component following the movements of the air guiding device 3 such that it will switch into its operative position precisely when the air guiding device 3 starts to shade off the light beam of the first brake light 27. This third switch 43 is connected on the input side with the brake light switch 41. On the output side, the first brake light 27 is connected to the inoperative contact and the second brake light 29 is connected to the operative contact. As long as the air guiding device 3 is above the change-over point of the switch 43, the second brake light 29 is connected by way of the operative contact with the brake light switch 41. In contrast, when the air guiding device 3 is situated below the change-over point, the switch 43 is in its inoperative position, and the first brake light 27 is connected with the brake light switch 41.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle having an air guiding device which is arranged in a rear area of the motor vehicle and which is displaceable between a retracted inoperative position and an extended operative position, a first brake light being provided on a vehicle body part which directly adjoins a front edge of the air guiding device and a second brake light being provided on a transversely extending rearward edge area of the air guiding device, at least one of said first and second brake lights being visible from the rear when the air guiding device is in any position.

2. A motor vehicle according to claim 1, wherein the first brake light is placed in a recess of a niche-type indentation of a stationary rear center part and is held in position there.

3. A motor vehicle according to claim 1, wherein the first brake light is placed in a recess of a niche-type indentation of a folding top compartment lid and is held in position there.

4. A motor vehicle according to claim 1, wherein the second brake light is placed in a receiving device arranged on the rearward side of the extendable air guiding device.

5. A motor vehicle according to claim 1, wherein the second brake light is covered in the retracted inoperative position of the air guiding device.

6. A motor vehicle according to claim 1, wherein in the retracted inoperative position of the air guiding device 3, the first brake light is connected.

7. A motor vehicle according to claim 1, wherein, when the air guiding device is moved out, starting from an intermediate position, the first brake light is covered by the extended air guiding device.

8. A motor vehicle according to claim 1, wherein the first brake light as well as the second brake light are triggered during the braking operation when the air guiding device is between the retracted inoperative position and a completely extended operative position.

9. A motor vehicle according to claim 8, wherein, in the inoperative position, only the first brake light is triggered and, in the operative position, only the second brake light is triggered.

10. A motor vehicle according to claim 9, wherein a first switch for monitoring the operative position and second switch for monitoring the inoperative position are provided, the two switches being connected on the input side with a brake light switch and being connected on the output side with the brake lights and the two switches interrupting the connection between their respective input and output when the air guiding device has reached the position assigned to the respective switch.

11. A motor vehicle according to claim 1, wherein, during a braking operation, the second brake light is triggered as soon as the air guiding device enters into a light beam radiated from the first brake light.

12. A motor vehicle according to claim 11, wherein a change-over switch is connected with the air guiding device such that the change-over switch is operated when the air guiding device enters into the light beam of the first brake light, and an input of the change-over switch is connected with a brake light switch and the outputs are connected with one of the brake lights respectively.

13. An arrangement of a brake light in a motor vehicle having a rear air guiding device, comprising:
    a rear body structure of a motor vehicle defining an indentation for receiving an air guiding device;
    an air guiding device operatively coupled to said rear body structure to be movable between a retracted inoperative position located at least partially within said indentation and an extended operative position at least partially outside of said indentation, said air guiding device defining a rearward-facing recess, said recess being located within said indentation when in said retracted inoperative position and being located outside of said indentation when in said extended operative position; and
    a brake light disposed in said recess.

14. An arrangement according to claim 13, wherein said rear body structure further defines a further rearward-facing recess located in front of and above said indentation, a further brake light being arranged in said further rearward-facing recess, said air guiding device extending at least partially into a light radiation area of said further brake light when in said extended operative position.

15. A rear air guiding device for a motor vehicle, comprising:
    an upper shell including a plurality of fins; and
    a lower shell connected to said upper shell, said lower shell defining a rearward-facing recess for receiving a brake light.

16. A rear air guiding device according to claim 15, further comprising a brake light mounted in said rearward-facing recess.

17. A rear air guiding device according to claim 16, wherein said air guiding device is mounted in a rear lid of a motor vehicle to be movable between an inoperative retracted position and an operative extended position, said brake light being concealed in said rear lid when in said inoperative retracted position, and said brake light being exposed when in said operative extended position.

18. A rear air guiding device according to claim 17, wherein said fins have upper edges which define a surface which is essentially flush with adjacent portions of said rear lid when in said inoperative retracted position, said rearward-facing recess being below said surface.

* * * * *